Feb. 12, 1935. A. C. DAVIDSON 1,990,638
SPRING FRICTION DEVICE
Filed Oct. 25, 1933 2 Sheets-Sheet 1
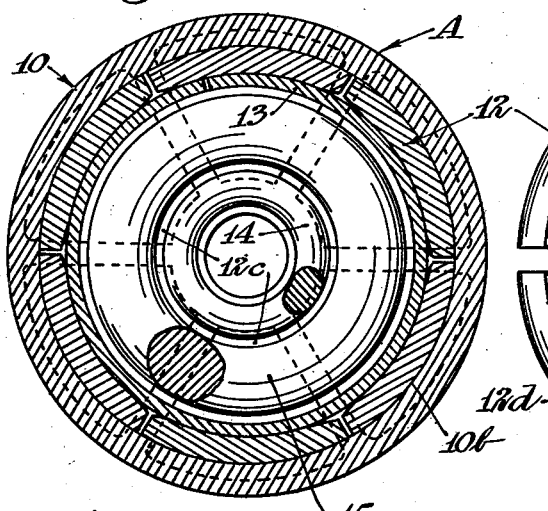
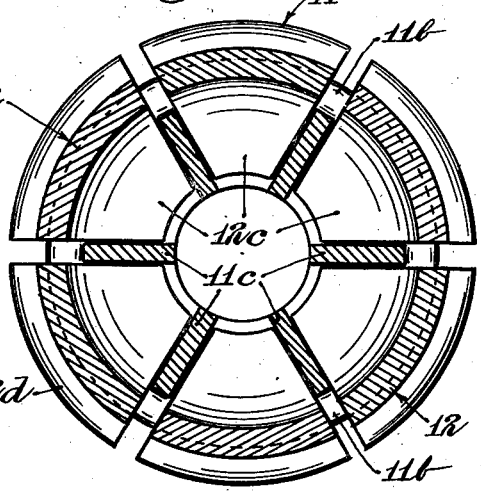
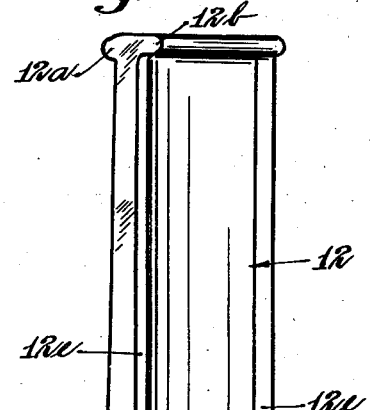
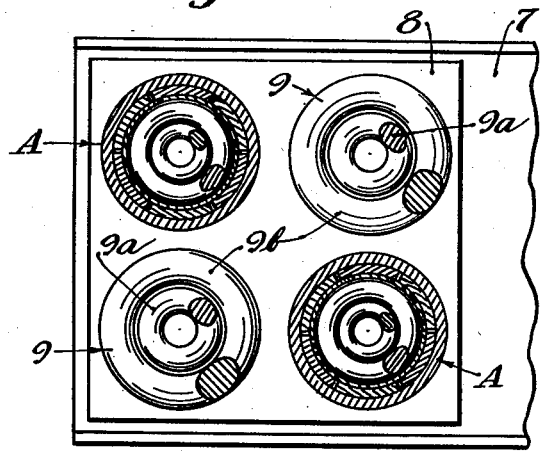
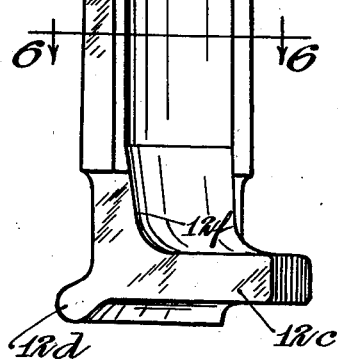
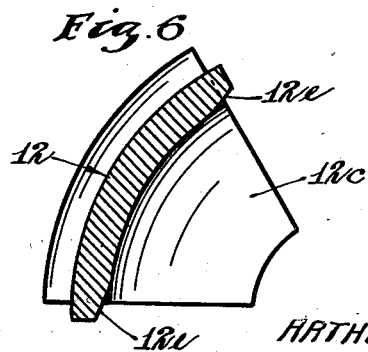
INVENTOR.
ARTHUR C. DAVIDSON.
BY HIS ATTORNEYS.

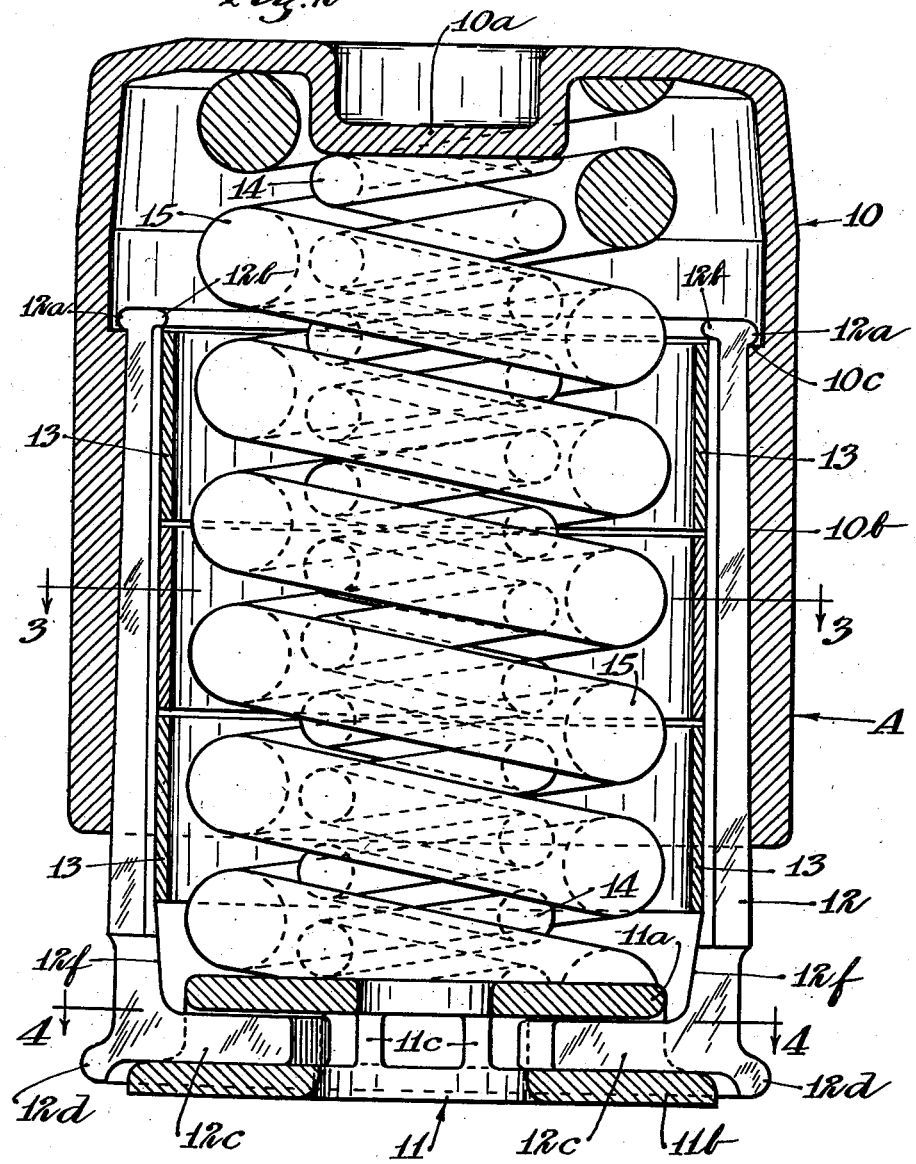

Patented Feb. 12, 1935

1,990,638

UNITED STATES PATENT OFFICE 1,990,638

SPRING FRICTION DEVICE

Arthur C. Davidson, Chicago, Ill.

Application October 25, 1933, Serial No. 695,109

6 Claims. (Cl. 267—9)

This invention relates to spring friction devices which are particularly adapted for use on railroad car trucks, although they may be used elsewhere if desired.

It is the general object of the invention to provide a novel and improved spring friction device of cheap, simple and sturdy construction which can be used to prevent the natural harmonic action of the spring or springs used in and with the device, and which can be assembled and disassembled with great ease.

A more detailed object is to provide a novel spring friction device for breaking down or interrupting the natural harmonic action of springs through frictional checks on the action of the springs.

The objects and advantages of the invention will more fully appear from the following description, made in connection with the accompanying drawings, wherein like reference characters refer to the same or similar parts throughout the various views, and, in which, Fig. 1 is a horizontal sectional view taken through a group of springs and spring friction devices of the invention located in operative position at one end of a spring plank of a car truck;

Fig. 2 is a vertical section taken through a spring friction device of the invention;

Fig. 3 is a horizontal section taken on the line 3—3 of Fig. 2, as indicated by the arrows;

Fig. 4 is a horizontal section taken on the line 4—4 of Fig. 2, as indicated by the arrows;

Fig. 5 is a view in side elevation looking towards one edge of one of the friction shoes that is used; and Fig. 6 is a horizontal section taken on the line 6—6 of Fig. 5, as indicated by the arrows.

Referring to the drawings, there is shown in Fig. 1 an end portion of a spring plank 7 for a car truck. Resting on this spring plank is a plate 8 and resting on the plate 8 are two compound springs 9 of standard construction and including inner and outer coiled compression springs 9a and 9b, while also resting on this plate are two of my spring friction devices A of the present invention. Preferably the compound springs 9 and spring friction devices A are set relative to each other at the corners of a square with the two compound springs 9 being set diagonally relative to each other and the two spring friction devices A being set diagonally relative to each other. This grouping of the spring friction devices A and the compound springs 9 may be varied as desired and any number of the spring friction devices A may be used with one or more of the compound springs 9 of standard construction.

Each spring friction device A includes a cylindrical thimble 10 open at one end and preferably closed at its other end, the closed end being preferably provided with an inwardly cupped portion 10a to form a spring centering device. From the open end of the thimble 10 toward the closed end, the inner walls of the thimble converge slightly to form the surfaces 10b. These surfaces 10b terminate short of the closed end of the thimble and the chamber formed by the thimble is enlarged somewhat between the surfaces 10b and the closed end of the thimble to form a shoulder 10c. In the drawings the taper or convergence of the surfaces 10b is somewhat exaggerated beyond what it will be in actual practice to better show the same.

Disposed in spaced relation from the open end of the thimble away from the closed end thereof is a circular head 11. This head consists of two spaced rings 11a and 11b interconnected by regular circumferentially spaced radial webs 11c. The ring 11b is preferably of somewhat greater circumference than is the ring 11a. In the illustrated embodiment six radial webs 11c are provided.

Fitting within the thimble 10 and projecting beyond the open end thereof are a plurality of friction shoes 12 having arcuate outer surfaces which engage the inner surfaces 10b of the thimble. These friction shoes are assembled together to form a many part cylindrical shell which engages the inner walls of the thimble. In the illustrated embodiment six friction shoes are shown, although it will be understood that any desired number of these shoes may be used. The outer surfaces of these shoes taper slightly from points spaced from the open end of the thimble toward the closed end of the thimble, so that the shell formed by the shoes has outer surfaces which converge slightly toward the closed end of the thimble. At their ends most closely adjacent the closed end of the thimble, the shoes 12 are provided with outwardly extending rounded flanges 12a which normally overlie the shoulder 10c and at these same ends the shoes are provided with inwardly extending rounded flanges 12b for a purpose presently to appear. The shoes 12 are reduced somewhat in width at their end portions most closely adjacent the open end of the thimble and at these ends the shoes are provided with inturned feet 12c which are received within the recesses formed in the head 11 between the two rings 11a and 11b and the webs 11c. The webs 11c act to maintain the different friction shoes 12 of the shell in regularly spaced circumferential relation through cooperation of these webs with the feet 12c. It is, accordingly, never possible for the shoes to crowd together and leave a wide portion, taken circumferentially of the surfaces 10b of the thimble, against which no shoe bears. The friction shoes 12 are preferably provided with arcuate flanges 12d joining the outer edges of the feet 12c and spaced somewhat radially from the ring 11b of the head.

There are provided a number of split rings 13 which are under spring tension to move from a true circle when the split ends join, to substantially C-shape. For want of a better name, these split rings 13 may be called split circular springs. In the illustrated embodiment, three of these split circular springs 13 are used, although any desired number from one up of these springs may be used. The springs 13 are of a diameter when compressed to be received within the many part shell formed by the friction shoes 12 and they are located within this shell to bear against the various friction shoes 12 and urge these shoes radially outwardly to bring the outer surfaces of the shoes into frictional engagement with the surfaces 10b of the thimble. In other words, the springs 12 tend to expand the many part shell formed by the friction shoes circumferentially. The springs 13 are located one above another within the shell and the inturned flanges 12b of the shoes prevent unintentional removal of the springs from the shell. The inner surfaces of the friction shoes 12 are beveled at 12e adjacent their edges, so as to insure proper bearing of the springs 13 against the various shoes. The shoes 12 are provided with inwardly inclined surfaces 12f at their inner sides joining the feet 12c so as to prevent the springs 13 from moving to points adjacent the feet 12c.

Bearing at one end against the spring centering device 10a of the thimble and at its other end against the ring 11a of head 11 is an inner coil compression spring 14, while surrounding this inner spring is a heavier coil compression spring 15 and this spring 15 bears at one end against the closed end of the thimble 10 in surrounding relation from the spring centering device 10a and it bears at its other end against ring 11a of head 11.

To assemble the spring friction device, the friction shoes 12 are arranged in shell-like form with their feet 12c disposed within the feet receiving recesses of the head 11. The shell formed by the friction shoes 12 is then encircled by a band or the like and the split circular springs 13 under compression are inserted in place within the shell. The two springs 14 and 15 are then disposed so that they rest on the ring 11a of the head 11 whereupon the thimble 10 is placed over the shell and parts assembled therewith and the head is moved toward the closed end of the thimble until such time as the outturned flanges 12a of the friction shoes move past the shoulder 10c. The parts of the device are then locked together so that they cannot be pulled apart without using great force to move the head 11 away from the thimble 10. The parts may be disassembled by exerting sufficient force tending to move the head 11 from the thimble, that the springs 13 will be sufficiently compressed to permit the rounded flanges 12a to ride over the shoulder 10c.

When one or more spring friction devices A are used in combination with one or more standard compound springs 9 in a car truck, the spring friction device or devices, act not only to dampen the action of the springs 14 and 15 of the spring friction device, or devices, to prevent natural harmonic action of these springs, but they also act to dampen the natural harmonic action of the compound spring or springs 9. As the spring friction devices A and the springs 9 are placed under additional compression, the head 11 of each spring friction device moves toward the thimble 10 thereof to cause the many part shell formed by the friction shoes 12 to slide relative to the thimble 10. The split circular springs 13 exert constant tension on the friction shoes 12, tending to expand the shell formed by these shoes circumferentially and, of course, the friction shoes 12 exert their pressure against the surfaces 10b of the thimble, so that these shoes offer frictional resistance to relative sliding movement between the shoes and the thimble. This frictional resistance is augmented during the compressive movement of the spring friction device by reason of convergence of the surfaces 10b of the thimble and the convergence of the outer surfaces of the shell formed by the friction shoes. The friction exerted by the shoes 12 against the surfaces 10b offers resistance or drag on the compressive movement of the spring friction device and this interferes with and breaks up the natural harmonic action of the two springs 14 and 15 and as the compound springs 9 in connection with which the spring friction device or devices are used compress as the springs 14 and 15 of the spring friction device or devices compress, the natural harmonic action of the springs 9 will similarly be broken up. After compressive movement of the spring friction device, the friction shoes still offer resistance to sliding movement of the shell away from the thimble 10 and the springs 14 and 15 and the springs 9 are thus prevented from rebounding in their natural periodic time, thereby causing the rebound action of the springs to be dampened. Also as the springs 14 and 15 have been slowed down in their compressive action, due to the frictional resistance offered by the shoes 12, the natural rebound action of these springs is further dampened. By reason of these facts, much greater stability and easier riding qualities are given to a car having a car truck equipped with the spring friction device of the invention.

The spring friction device of the invention is of exceedingly simple and cheap construction and is most efficient in use.

It will, of course, be understood that various changes may be made in the form, details arrangement and proportions of the various parts without departing from the scope of the present invention, which, generally stated, consists in the matter shown and described and set forth in the appended claims.

What is claimed is:—

1. A spring friction device having in combination a thimble open at one end, a plurality of friction shoes having outer surfaces shaped to engage portions of the inner walls of said thimble, said friction shoes being assembled together within said thimble to form a many part shell having bearing against the inner walls of said thimble, a spring reacting between said thimble and shell and urging said shell outwardly from the open end of said thimble and a split circular spring bearing against the inner sides of said shoes and disposed within said shell and urging said shell to expand circumferentially.

2. A spring friction device having in combination a thimble open at one end and having a spring bearing portion at its other end, a head disposed in spaced relation from the open end of said thimble, a plurality of friction shoes shaped to engage portions of the inner walls of said thimble, said friction shoes being assembled together within said thimble to form a many part shell having bearing against the inner walls of said thimble and said shoes having interlocking engagement with said head, a compression spring bearing at one end against said head and at its other end against said spring bearing portion and a split circular spring bearing against the inner surfaces of said shoes and urging said shell to expand circumferentially.

3. A spring friction device having in combination a thimble open at one end and having inner substantially cylindrical walls, a head disposed in spaced relation from the open end of said thimble, a plurality of friction shoes having outer surfaces of arcuate-shape in cross section formed to engage portions of the inner walls of said thimble, said friction shoes being assembled together within said thimble to form a many part shell having bearing against the inner walls of said thimble, said friction shoes having interlocking engagement with said head, and said head including means maintaining said friction shoes in regular circumferentially spaced relation from each other, a compression spring bearing at one end against said head and at its other end against said thimble and resilient means urging said shell to expand circumferentially, said shell and head being rotatable relative to said thimble.

4. A spring friction device having in combination a thimble open at one end and having a spring bearing portion at its other end, a head spaced from the open end of said thimble, a plurality of friction shoes having outer surfaces shaped to engage portions of the inner walls of said thimble, said friction shoes being assembled together within said thimble to form a many part shell having bearing against the inner walls of said thimble, said shoes projecting toward said head from the open end of said thimble and having inturned feet, said head having circumferentially spaced recesses therein receiving said feet to hold said shoes in regular circumferentially spaced relation, a compression spring having bearing at one end against said head and having bearing at its other end against said spring bearing portion and resilient means bearing against the inner surfaces of said shoes and urging said shell to expand circumferentially.

5. A spring friction device having in combination a thimble open at one end and having a spring bearing portion at its other end, a plurality of friction shoes having outer surfaces shaped to engage portions of the inner walls of said thimble, said friction shoes being assembled together within said thimble to form a many part shell having bearing against the inner walls of said thimble, said friction shoes projecting beyond the open end of said shell and having inturned feet, said friction shoes having inwardly extending flanges thereon, a split circular spring engaging the inner surfaces of said shoes and urging said shell to expand circumferentially, the flanges of said shoes preventing removal of said spring and a spring reacting between said spring bearing portion and said feet.

6. The structure defined in claim 5, and a head spaced from the open end of said thimble and having a plurality of radial recesses regularly circumferentially spaced from each other and receiving said feet, said last mentioned spring having bearing at one end against said head.

ARTHUR C. DAVIDSON.